[11] 3,587,431

| | | | |
|---|---|---|---|
| [72] | Inventor | Hermann Holler Vienna, Austria | |
| [21] | Appl. No. | 826,238 | |
| [22] | Filed | May 20, 1969 | |
| [45] | Patented | June 28, 1971 | |
| [73] | Assignees | Karl Vockenhuber Vienna, Austria; Raimund Hauser Vienna, Austria | |
| [32] | Priority | May 22, 1968 | |
| [33] | | Austria | |
| [31] | | A4943/68 | |

[54] ARRANGEMENT FOR INDICATION OF THE ZONE OF SHARPNESS
31 Claims, 13 Drawing Figs.

[52] U.S. Cl. .................................................. 95/44
[51] Int. Cl. .................................................. G03b 3/00
[50] Field of Search .................................. 95/44, 44 (C)

[56] References Cited
UNITED STATES PATENTS

| | | | |
|---|---|---|---|
| 3,326,104 | 6/1967 | Mische .................. | 95/44X |
| 3,372,628 | 3/1968 | Starp .................... | 95/44 |
| 3,386,356 | 6/1968 | Rentschler ........... | 95/44X |
| 3,486,432 | 12/1969 | Norwood ............... | 95/44 |

*Primary Examiner*—John M. Horan
*Assistant Examiner*—Richard M. Sheer
*Attorney*—Ernest G. Montague

ABSTRACT: A camera having an objective and focusing mechanism for the objective. A diaphragm is situated within the objective and is adjustable with respect to the brightness of the scene to be taken. A viewfinder system and at least first and second indicators are visible in the viewfinder. An adjusting device for at least one of the indicators is arranged to vary the distance between the indicators. The distance defines a section of line visible in the viewfinder. The section of line corresponds to a perspective reproduction of a fictitious section of line of known size. The fictitious section of line is supposed to be situated on one of the limits of the depth of field. A calculating mechanism is provided for computing the depth of field and the length of the distance from a given set of values and controlling the adjusting mechanism accordingly. The values determine at least one limit of the depth of field and comprise at least the diaphragm aperture and the setting of the focusing mechanism.

FIG.1

$\sigma = \dfrac{f}{d}$

ARRANGEMENT FOR INDICATION OF THE ZONE OF SHARPNESS

The present invention relates to an arrangement for indication of the zone of sharpness in a viewfinder, preferably in a reflex finder of photographic or cinematographic cameras, by means of at least two marks.

As it is known, it is possible to record a certain depth of field with lenses of photographic and cinematographic cameras, in consideration of a certain lack of sharpness determined by the limited resolution of the retina of the human eye. The depth of field extends in front and behind the optimum setting of the plane of sharpness. This so-called zone of sharpness is determined in its extension and position by the following factors: setting of the diaphragm; setting of the distance; and, with zoom lenses, setting of the focal length. In order to make full use of the efficiency of modern photographic lenses, the cameras are generally equipped with a range finder, which is forcibly coupled with the focusing mechanism of the lens. The distance scale of the lens and a so-called depth of field ring which shows the values of the aperture stop symmetrically indicated on both sides of a setting mark, cooperate in a well known manner.

In order to obtain a sharp picture of the object field on the film, first one has to measure the near limit and the far limit of the field to be taken by means of a range finder, and to read off the numerical values from the scale. By turning the focusing ring on the lens, the two values of the distance scale are compared to equivalent $f$-numbers on the depth of field ring. As a consequence, the lens is set on average distance, which however is of minor importance for the image composition.

Since checking the near limit and the far limit, as well as checking the corresponding setting on the distance scale and on the depth of field ring can only be done with the camera removed from the eye, this manipulation is rather complicated. These already complicated settings with fixed focal length cameras become still more difficult with zoom cameras by the introduction of the focal length as a third variable factor. Up to now multisectional depth of field tables have been used with such cameras. For this purpose also instruments similar to slide rules have been suggested enabling reading off the range of sharpness in dependence on the three variable factors. The described methods in fact permit an exact determination of the utilizable zone of sharpness; however their manipulation is so complicated that one rather prefers to restrict oneself to an exact distance measurement.

For shots with photographic cameras, where only stationary events are recorded, these conventional instruments as described above are suitable, although they are complicated. In comparison therewith, however, the conditions for cinematographic shots are much more difficult, since the subjects to be taken are in motion and the distance from the subject changes permanently while shooting. As known from experience, an adjustment of the distance setting while shooting is very difficult, so much the more as the cameraman is concentrated first of all to follow the events to be seen in the viewfinder, i.e., the events in the object field. An adjustment of the sharpness may be possible in particular cases; however it is limited to a determined sharpness plane of the principal subject, which however must not be applicable to the depth of field of the total scene, since the extension of the depth of field is larger in the backward direction than in the forward direction. Another difficulty in adjusting the distance is, that it is not recognizable in an unsharp viewfinder image, in which sense the set distance deviates from the optimum.

In spite of their high expenditure, these conventional measuring instruments could only attain a doubtful importance for cinematographic equipment. The present invention is bases on the reflection that in the case of photographic or cinematographic shots, the size in which a subject is reproduced on the film determines the image composition, whereas the shooting distance is of subordinated importance, as it may be variable with different focal lengths, although the size of the subject is always the same. The numerical indications of distance with conventional instruments are only necessary for special manipulations, as for instance the determination of the depth of field, since tables and/or depth of field scales refer to these numerical indications.

It is an object of the present invention to provide a device by which the problems set forth above are solved in that an arrangement is provided, which displaces a mark or the like arranged in the viewfinder, such that this mark defines a section of a line together with another particularly stationary mark. This section corresponds to the perspective reproduction of a fictitious section of a line of known size through the viewfinder system, the fictitious section being supposed to be situated on a depth of field limit. The displacement of the mark is effected in dependency on factors determining the size and position of the depth of field of the taking objective. These factors are the following: diaphragm, distance setting and focal length. By this arrangement it is guaranteed to state immediately in the viewfinder, whether a certain subject of known size is within the depth of field of the reproduction or not. If not, it may likewise be possible to determine immediately in the viewfinder the direction in which a correction of the camera setting has to be executed.

In an advantageous embodiment of the invention two sections of lines are indicated in the viewfinder, corresponding to the depth of field limits. In order to guarantee a clear indication of the depth of field in a near field as well as in a field at a great distance, it is advisable to provide a device changing the measuring range, by which the mark or the marks, respectively, are displaced in correspondence with the application of fictitious sections of different lengths within the field.

Since in most of the cases the subject important for the shot is represented by a person, it is advisable to choose the lengths of the fictitious sections in the shooting area in correspondence with the dimensions of the human body. Here it is advantageous to measure particularly the height of the head, the interocular distance, and the eye size, since these values are subject to rather small deviations.

Photographic cameras have already been produced, in which the height of the face served for measuring the distance of the subject. However with these arrangements the distance of the subject is only set with fixed focal length, without determination of the depth of field or taking into consideration other focal lengths.

With these and other objects in view, which will become apparent in the following detailed description, the present invention will be clearly understood in connection with the accompanying drawings, in which.

Figures 1, 2A:
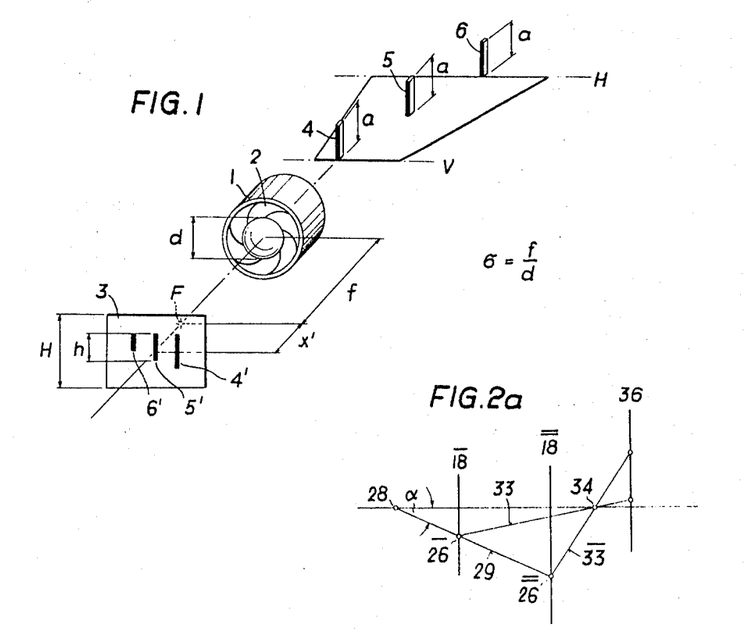
FIG. 1 is a perspective view schematically showing the principle on which the invention is based.
FIG. 2a illustrates the geometric relations of the mechanical calculator shown in FIG. 2.

Referring now to the drawings, and in particular to FIG. 1, a camera lens 1 has a focal length $f$. The rear focus of the lens is indicated by the letter F. A diaphragm 2 is indicated within the lens 1, having a diameter $d$. The image projected by the lens is caught by a screen 3, which for example may be developed as a ground glass. To avoid obscuring the drawing, neither the sensitive film, nor the beam-splitting mirror, which partially reflects the viewfinder image from the imaging path of rays, have been illustrated.

In the field, three columns 4, 5, 6 are disposed with a height $a$. By means of a displacement by a section $x'$ of the image catching screen 3 relative to the lens, a sharp reproduction of column 5 is attained on the screen. In the drawing the image of column 5 is indicated by 5'. On account of the limited resolution of the human eye, however, not only the subjects disposed in the plane of column 5 appear sharp, but every subject situated in the so-called depth of field, extending in front and behind the plane of focus bearing column 5, will be reproduced on the film or screen respectively with adequate sharpness. Descisive for the extension of the depth of field is first the tolerated lack of sharpness or the diameter of the circular disc, respectively, which results in an image of a point in the field (blur circle). The diameters of the blur circle depend on the format of the image and with an 8 mm. film format they are assumed with 0.013 mm. The extension of the zone of sharpness depends further on the data of the camera lens, i.e., of the focal length $f$, on the $f$-number ($\sigma = f/d$), wherein $d$ represents the diameter of the aperture stop or the diameter of the entrance pupil, respectively, and also on the displacement $x'$ of the lens or the set distance of the object, respectively. In the drawing the front limit of the depth of field is indicated by the letter V and the rear limit by the letter H. The column 4 is disposed on the front limit, and the column 6, on the rear limit of the depth of field. The columns 4 to 6 are reproduced on the screen 3 in correspondence with their distance from the camera lens in perspective reduction (4' to 6'). According to the law of imagery and the known equations for the front and the rear limit of the depth of field, there results a height $h$ of the columns situated on the depth of field limits:

$$h = c \cdot H \cdot \left( \frac{x'}{f} \pm U \cdot \frac{\sigma}{f} \right)$$

in which equation $c$ represents a constant of proportionality, $H$ the height of the viewfinder image and $U$ the allowed lack of sharpness (diameter of the blur circle). If, with unchanged setting of the camera lens, the column 5 is displaced in the axial direction, the size of the image 5' changes accordingly. It will however be recognizable that the column 5 will be within the depth of field always, when its image 5' is larger than the image 6' of column 6 and smaller than the image 4' of column 4. The same refers in analogous manner also to the changed settings of the camera lens, whereby however the columns 4 to 6 must always be disposed on the limits of the depth of field.

Starting from this consideration, the present invention proposes to indicate adequate sections in the viewfinder instead of the images 4' and 6', the lengths of which sections depend on the focal length, the distance setting and the $f$-number of the camera lens, in accordance with the equation quoted above. For this purpose adequate marks are indicated in the viewfinder, which confine the sections corresponding to the depth of field limits. As shown in the following by way of examples, this indication may be performed in a mere mechanical, electrical and optical manner, whereby naturally also combinations of different arrangements are possible. The measuring procedure outlined above refers to a subject of constant size $a$ to be measured and which is situated in the field. Since the most important subject for photography and especially for amateur film is the human being, it is logical to call upon the height of the head or the face for instance as measuring size, which in the case of adults is subject to rather little deviations. Taking an average head size of 240 mm. as a basis, there results a constant of proportionality of $c = 60$, so that for 8 mm. film the formula for $h$ will read:

$$h = 60 \cdot H \cdot \left( \frac{x'}{f} \pm 0.013 \frac{\sigma}{f} \right)$$

Figure 2:
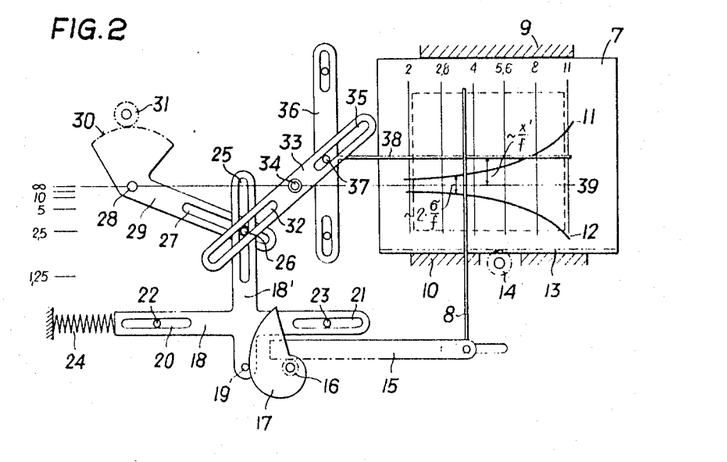
FIG. 2 likewise is a schematic illustration of the indicating mechanism with mechanical displacement of the measuring marks.

Referring now again to the drawings, and more particularly to FIG. 2 there is illustrated an arrangement indicating the two sections within the viewfinder. The indication corresponding to the first part of the equation quoted above, is effected by means of a mechanical calculator, while the second part is executed by means of a transparent disc 7 displaceable according to the diaphragm setting in cooperation with a pointer 3. The disc 7 is arranged shiftably in the horizontal direction in guides 9 and 10 and bears two hyperbolic curves 11, 12 having a common horizontal asymptote. The disc 7 is provided on the lower edge with teeth 13 mating with a pinion 14, which is rotatable by the diaphragm setting mechanism. The pointer 8 cooperating with the curves 11, 12 is fastened to a toothed rack 15, which is displaceable by a gear wheel 16 coupled to the focal length setting mechanism of the camera lens. Coaxially to the gear wheel 16, a cam plate 17 is provided cooperating with a pin 19 arranged on a horizontally guided slider 18. The slider 18 is provided with elongated holes 20 and 21, in which it is guided by means of stationary bolts 22 and 23. A spring 24 strives to urge the slider to the right, whereby the pin 19 is pressed against the cam plate 17. The slider 18 has a further elongated hole 25 in a vertically extending arm 18', in which a liberally shiftable pin 26 is guided. The pin engages an elongated hole 27 of a two-armed lever 29 pivoted round an axis 28, the lever bearing a toothed segment 30 on its second arm. A pinion 31 coupled with the distance setting mechanism of the camera mates with the toothed segment 30 and deviates the lever 29 in clockwise sense upon adjustment of the camera lens to shorter shooting distances. The pin 26 further penetrates an elongated hole 32 of a two-armed lever 33, which is pivotally arranged on an axis 34. The lever 33 shows a second elongated hole 35, in which a bolt 37 is guided, arranged on a vertically shiftable slider 36. The slider 36 bears a pointer 38, which extends into the viewfinder image. The interval of the pointer 38 from the asymptote of the two hyperbola 11 and 12 corresponds to the quotient $x'/f$, while the portion of the pointer 8 lying between the hyperbola 11 and 12 conforms to the double quotient of $\sigma/f$. The section of the pointer 8 lying between the pointer 38 and the curve 11 consequently conforms to the image size of a subject 240 mm. high, located on the rear depth of field limit. In contrast thereto, the section of pointer 8 lying between the pointer 38 and the curve 12 illustrates the image size of the subject disposed on the front depth of field limit. If therefore the head of a person is reproduced in a size lying between these two sections, it means that this person is within the depth of field and consequently is reproduced with adequate sharpness. A reproduction of the head smaller than the section determined by the pointer 38 and the curve 11 on the pointer 8 means that the person to be filmed is outside the depth of field and too far away from the camera. On the other hand, if the reproduction of the head is larger than the section determined by the pointer 38 and the curve 12 on the pointer 8, the distance between the person and the camera is too small to obtain a sharp reproduction. When changing one or more setting values of the camera lens, the pointers 8, 38 and/or the transparent disc 7, respectively, are displaced and the critical image sizes are indicated. The numerical values of the diaphragm, the focal length and the distance setting no longer have importance, as the results of the displacement of the camera lens are immediately recognizable in the viewfinder.

Referring now again to the drawings, and more particularly to FIG. 2a the substantial geometric structure of the calculator illustrated in FIG. 2 is illustrated for two different focal length settings, whereby the same references have been used for corresponding parts. For a determined distance setting the pivoted lever 29 forms an angle $\alpha$ with the connecting line between the points of rotation 28 and 34 of the levers 29 and 33. The position of the pin 26 on the lever 29 is determined by the position of the slider 18. The position of the slider $\overline{18}$ corresponds to a setting of the focal length of $f = 8$ mm., while position $\overline{\overline{18}}$ corresponds to a focal length setting of 45 mm.

From the respective positions of the pin 26 there results a distortion of the lever 33. Hence it follows that the vertical displacement of the slider 36 and therewith of the pointer 38 is proportional to the product of the distance of the slider 18 from the point of rotation 28 and the tangent of the angle $\alpha$. By adequate formation of the control curve 17 it is possible to design the displacement of the slider 18 proportionally to the reciprocal value of the focal length setting. In analogous manner the tangent of the angle $\alpha$ may be rendered proportional to the displacement of the lens, so that the displacement of the pointer 38 becomes proportional to the quotient $x'/f$.

In order to obtain a sensible indication in a near field as well as in a far distant field, it is advantageous to provide means for changing the measuring range. Upon changing the measuring range, the measuring bases upon reference sections of different lengths. This for instance, the size of an adult may be chosen for a far distant field, the head size for a medium field and the size of the eyes or nose for a near field.

Figure 3:
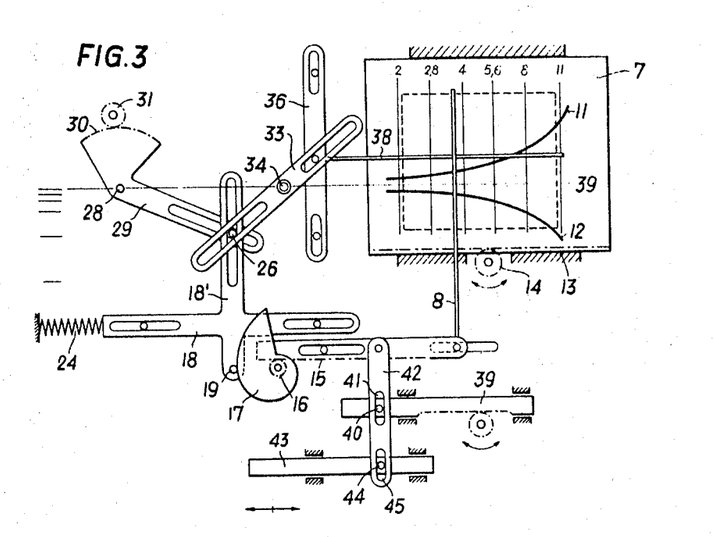
FIG. 3 shows a variation of the indicating mechanism displayed in FIG. 2 with additional means for changing the measuring range.

Such an arrangement is illustrated in FIG. 3 of the drawings, which largely corresponds with that of FIG. 2. In this arrangement the focal length setting mechanism does not directly cooperate with the toothed rack 15, but engages in a horizontally shiftable toothed rack, to which is fastened a bolt 40. A lever 42 is guided by means of the bolt and an elongated hole 41, and is pivoted to the toothed rack 15. A bolt 44 arranged on a toothed rack engages in a second elongated hole 45 of the lever 42. The toothed rack 43 is shiftable in the horizontal direction and displaceable to three different positions corresponding to the chosen measuring ranges. According to the measuring ranges A, B and C an additional movement is superimposed to the pointer 8. In connection with the changed position of the pointer 38, sections are indicated in the viewfinder, which correspond to the image size of reference sections, arranged on the depth of field limit; however, they show different lengths depending on the respective measuring range.

In cameras with automatic exposure control it is not at once possible to provide in the viewfinder a slider 7 shiftable in the longitudinal direction. In consideration of a torque requirement of the galvanometer displacing the diaphragm vane of the lens, as small as possible, it is advisable to arrange the transparent screen pivotally and directly on the axis of the galvanometer.

Figure 4:
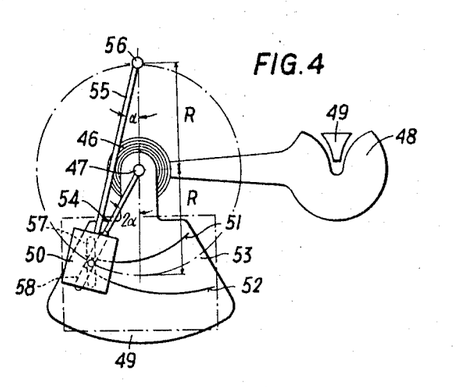
FIGS. 4 and 5 are front and side elevations respectively, of an embodiment for cameras, the diaphragm of which is adjustable by a moving coil GALVANOMETER.
Figure 5:
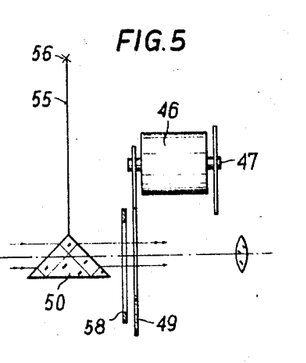

Referring now again to the drawings and in particular to FIGS. 4 and 5, such an arrangement is illustrated in front and side elevation, respectively. A galvanometer 46 fed by a photoelectric cell, not shown, bears the diaphragm vane 48 of the camera lens on its axis 47, the diaphragm vane determining together with a stationary mask 49 the aperture stop of the lens. Further a transparent screen 49 is arranged on the axis 47 of the galvanometer, which is visible through the viewfinder eyepiece. In correspondence with FIGS. 2 and 3, the screen 49 bears curves 51 and 52, which approach asymptotically a circle 53. In front of the screen 49 there is arranged a Dove prism 50, which on the one hand is supported by a lever 54 and on the other hand is guided by a lever 55. The lever 54 is pivoted coaxially to the axis of the galvanometer. The bearing 56 of the lever 55 is situated on the periphery of the circle 53. The angle $\alpha$ formed by the lever 55 and the plane of symmetry, represents therefore an inscribed angle in relation to the angle at the center $2\alpha$ formed by the lever 54 and the plane of symmetry. Thereby it is attained that upon avertence of the lever 54, the Dove prism only turns with half of the angular velocity and forms an upright image of a slot-shaped window 58 radially arranged with respect to the axis 47, and the measuring sections appear vertically in the viewfinder in all of their positions. The displacement of the lever 54 takes place analogously to the displacement of the pointer 8, as shown in FIGS. 2 and 3. A pointer corresponding to the pointer 38 (according to FIGS. 2 and 3) has not been illustrated in FIGS. 4 and 5; it may however be arranged and controlled in an analogous manner.

Figure 6:
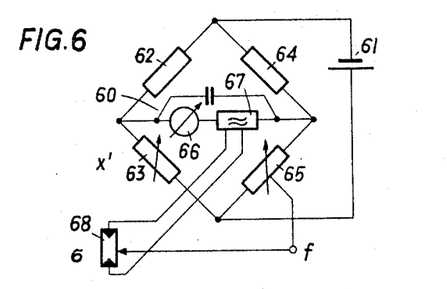
FIG. 6 is a circuit diagram of another embodiment, in which the indication results by means of an AC vibration galvanometer.
Figure 7:
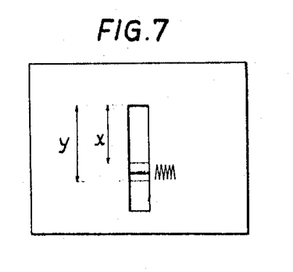
FIG. 7 illustrates the corresponding indication in the viewfinder.

Referring now again to the drawings and in particular to FIGS. 6 and 7, a mere electrical indication of the depth of field is displayed. Resistors 62, 63, 64 and 65 are arranged in a measuring bridge circuit (Wheatstone's bridge), which is fed by a DC source 61. An AC source 67 of variable power output connected in series with a vibration galvanometer 66 is provided in the diagonal of the bridge. The control of this AC source takes place over a variable resistor 68, preferably designed as a photoelectric resistor. The photoelectric resistor is variable in dependency on the $f$-number of the aperture stop of the camera lens, as well as in dependency on the focal length of the lens, which however has not been illustrated. This may be effected by illuminating the photoelectric resistor 68 by a lamp, in the path of the rays of which diaphragms or neutral wedges are provided, which are adjustable in dependency on the two settings. The setting mechanism for the focal length further works on the rheostat 65. The distance setting of the lens or the displacement of the front member of the lens, respectively, causes a change of the resistor 63. By the DC bridge circuit, direct current is led to the vibration galvanometer 66, which is proportional to the quotient $x'/f$, while the AC source 67 produces a current proportional to the quotient $\sigma/f$. The pointer of the vibration galvanometer will therefore oscillate with an amplitude proportional to $\sigma/f$, about an average value proportional to the quotient $x'/f$.

Referring now again to the drawings, FIG. 7 shows the pertaining viewfinder image. The section X indicates the rear depth of field limit, and Y the position of the front depth of field limit.

Figures 8, 11:
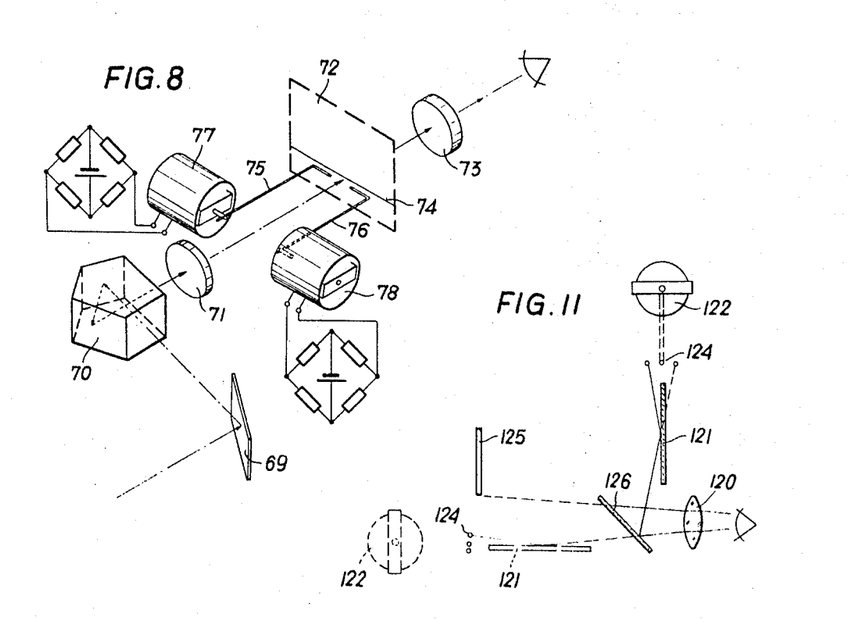
FIG. 8 is a perspective view of a viewfinder system with two moving-coil instruments for indication of the two depth of field limits.
FIGS. 10 and 11 are illustrations of viewfinder systems according to the present invention.

Referring now again to the drawings, FIG. 8 displays a variation of the system shown in the preceding FIGS., essentially differing only in that separate measuring circuits are provided for the indication of the depth of field limits. From the imaging path of rays of the camera, a part of the light incident from the lens is reflected to a veiwfinder system by a beam-splitting mirror 69. The image is formed in the viewfinder system by means of a prism 70 and a lens 71 in a plane 72. This intermediate image will be contemplated through an eyepiece 73. A reference line is arranged in the plane of the intermediate image, which line cooperates with the pointers 75 and 76 of two moving-coil galvanometers. The two galvanometers are disposed in the circuit of the measuring bridges, by means of which the equations are electrically simulated:

$(x'/f+\sigma/f)$ and $(x'/f\sigma/f)$.

For this purpose different resistors of the bridge are displaceable dependent on the setting values of the camera lens. The intervals of the pointer 75 and 76 from the reference line designate the front and the rear depth of field limit. Within the scope of the present invention, of course, also all the other known circuits may be used, which enable the formation of quotients and sums, instead of bridge circuits.

Figure 9:
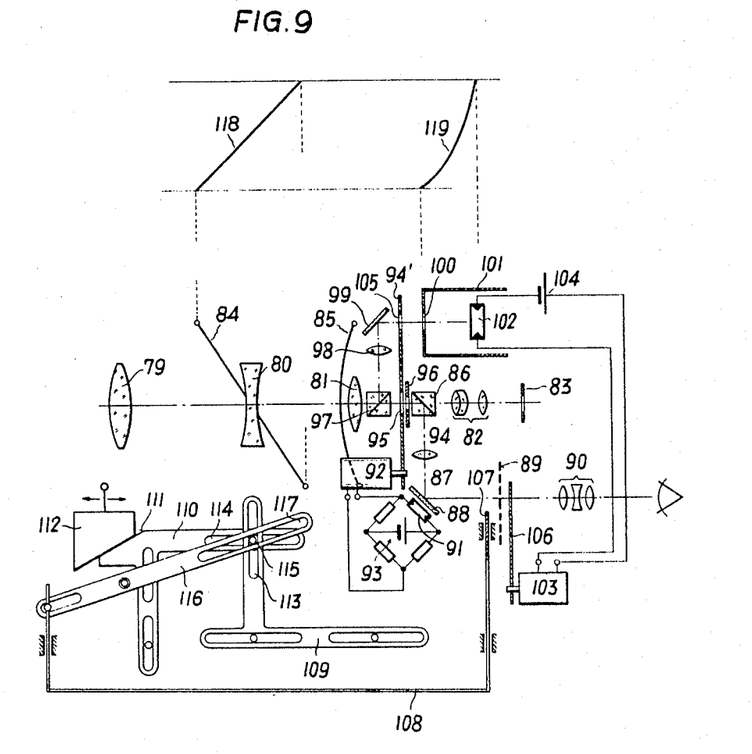
FIG. 9 IS A SCHEMATIC ILLUSTRATION OF THE OPTICAL SYSTEM OF A CINEMATOGRAPHIC camera.

Referring now again to the drawings, and in particular to FIG. 9, the optical system of a substandard format film camera is disclosed. The camera is provided with a zoom lens. The zoom system comprises a front-lens attachment of variable magnification comprising two positive members 69 and 81, between which a negative member 80 is movably disposed. The intermediate image produced by the front-lens attachment is really reproduced in the film gate by a main lens of fixed focal length 82. For adjustment of the magnification of the front-lens attachment, the negative member 80 is displaced according to a linear law of motion (straight line 84). In order to keep the image plane constant upon changing the magnification, the positive member 81 has to be displaced according to a curve 85. The front member 79 is shiftable in axial direction for focusing of the lens. A beam-splitting prism is indicated in the drawings by the number 86. By means of the beam-splitting prism about 20 percent of the light incident through the front-lens attachment is reflected to a viewfinder system. This system comprises a viewfinder lens 87 producing an intermediate image on the plane 89 by means of a mirror 88. The intermediate image may be contemplated through an eyepiece 90. The mirror 88 is likewise partially permeable and allows approximately 50 percent of the incident light to pass. The light passing the partly permeable mirror 88 strikes a photoelectric resistor 91 arranged in a Wheatstone bridge. A moving-coil galvanometer without directive force 92 is provided in the bridge diagonal. A diaphragm vane 94 is arranged on the shaft of the galvanometer 92, the diaphragm vane showing, as already known, a tapering and essentially sickle-shaped aperture 95, which determines together with a stationary mask 96 the opening of the aperture stop of the camera lens. In front of the aperture stop 94 to 96 there is arranged a further beam-splitting prism 97, which likewise deviates from the path of rays part of the light incident from the lens. The rays are collected by a lens 98 and reproduced in the window 100 of a measuring chamber 101 by means of a mirror 99. Inside the chamber there is arranged a photoelectric resistor 102 situated in the circuit of the moving-coil galvanometer 103 and of the battery 104. The diaphragm vane 94 of the aperture stop immerses with an extension 94' into the path of rays between the mirror 99 and the window 100 of the measuring chamber 101. In this range the diaphragm vane 94' also shows a one-sided tapering aperture 105 which influences the cross section of the beam of rays incident in the window 100 of the chamber.

On the shaft of the moving-coil galvanometer 103 there is arranged a pointer 106, which immerses into the path of rays of the viewfinder system in the range of the intermediate plane 89. This pointer 106 cooperates with a second pointer 107, which is controlled by a mechanical calculator by means of a linkage 108, a cord drive or the like. This calculator is designed similarly to that illustrated in FIGS. 2 and 3 and comprises a slider 109, coupled with the movable negative member 80 of the front lens, which however is not shown in detail. Besides this horizontally guided slider 109, a vertically guided slider is provided owing an oblique surface 111. By means of a spring, not shown, the slider 110 is urged with its surface 111 against an oblique control surface 112, which is coupled with the front member 79 and upon focusing, is displaced together with the latter in the axial direction. The two sliders 109 and 110 have elongated holes 113 and 114, which are penetrated by a common bolt 115. The bolt guides a two-armed lever 116 with an elongated hole 117 in which the linkage 108 engages.

The mode of operation of this arrangement is set forth in the following:

Upon adjustment of the focal length $f$ and/or respectively of the distance setting (by displacement $x'$ of the front member 79) the quotient $x'/f$ is formed by the mechanical calculator 109 to 117 and indicated by the pointer 107 in the viewfinder, in analogous manner to the embodiment disclosed in FIG. 2. The second quotient $\sigma/f$ of the equation for the image size of the reference section is produced by means of the measuring chamber 101 and is indicated in the viewfinder by the pointer 106 of the moving-coil galvanometer 103. With a light intensity I in the window 100 of the measuring chamber, the intensity of illumination E on the photoelectric resistor 102 changes with the square of the distance $e$ between the window and the photoelectric resistor. In order to attain the desired mathematical interrelationship, the distance $e$ is transformed according to the square root of $f$, i.e., $e=\sqrt{f}$ (curves 118 and 119 in FIG. 9). In accordance with the resistance diagram of the photoelectric resistor, the resistance R changes reciprocally proportionally with the intensity of illumination E. With an applied voltage V there results a current $i$, which is directly proportional to the intensity of illumination E on the photoelectric resistor.

By means of the diaphragm aperture 94 to 96 of the camera lens, the cross section of the beam of rays incident in the film gate 83 is influenced, thus that the efficient intensity of illumination remains constant with an assumed film speed. Hence it follows that the density of luminosity B is proportional to $\sigma^2$. The light intensity I efficient in the measuring chamber is likewise caused by the density of luminosity B emanating from the luminosity of the subject and is dependent linearly on the diaphragm area $q$ and therefore also proportionally to the square of the diaphragm diameter $d_1$ or $\sigma 1$ respectively. However, in order to obtain the desired quotient $\sigma 1/f$, the value $\sigma$ must be brought in the first power. The diaphragm diameter $d_1$ of the aperture 105 in the measuring chamber has therefore to be in relation to the diaphragm diameter $d$ (95 and 96) of the lens as $1/\sqrt{\sigma}$ to $1/\sigma$. As integral powers of $\sqrt{2}$ are used as series of $f$-numbers, there result integral powers of $\sqrt[4]{2}$ as corresponding $f$-numbers of the measuring chamber.

The basic equation $E=I/e^2$ is strictly speaking, only applicable under the condition that $e$ is very large in comparison to $q$ and the area of the photoelectric resistor is neglected. As in this special cause these conditions are not given, angles of incidence or angles of emission, respectively, must be taken into consideration.

Figure 10:
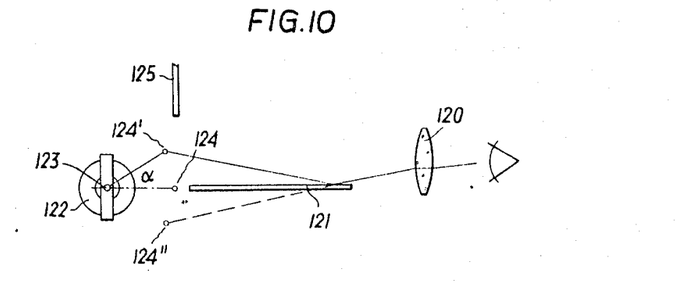

Referring now again to the drawings, and in particular to FIG. 10, an arrangement is disclosed, which enables the indication of the negative as well as of the positive value of the quotient $\sigma/f$ with a single instrument. A mirror 121 is provided in the path of rays of the viewfinder, the eyepiece of which is indicated by the number 120. A moving-coil galvanometer 122 which is energized by a current proportional to $\sigma/f$, is arranged, thus that its axis 123 is situated in the plane of the mirror 121 and in its rest position, the pointer 124 takes a position in the plane of the mirror 121. Upon distortion of the pointer 124 by an angle $\alpha$, corresponding to a value $\sigma/f$, the pointer is visible directly 124' as well as in the mirror 124''. In cooperation with a pointer 125, the distance of which from the rest position of the pointer 124 is proportional to the quotient $x'/f$, consequently, two different sections are indicated, i.e., one section between the pointer 125 and the mirror image 124'' of the instrument pointer 124 and a section corresponding to the distance of the pointer 125 and the instrument pointer 124 in the position of the pointer 124'. The first section represents the value $$h_1 = c \cdot H \cdot \left(\frac{x'}{f} + U \cdot \frac{\sigma}{f}\right)$$

while the second section has the value $$h_2 = c \cdot H \cdot \left(\frac{x'}{f} - U \cdot \frac{\sigma}{f}\right)$$

In order to assure a clear distinction of the mirror image of the pointer 124'' from the pointer 124, it may be useful to combine the mirror 121 with a color filter or to lend a certain spectral characteristic to the reflecting layer of the mirror by using thin optical layers. In the arrangement described above, however, certain difficulties could arise in that besides the pointer 125 also the mirror image of the pointer could be visible in the viewfinder.

Referring now again to the drawings, and in particular to FIG. 11, a variation of the arrangement described above is illustrated, which avoids this imperfection. In this arrangement, a partly permeable mirror 126 is provided in the path of rays of the viewfinder, by means of which mirror, the mirror 121 and the pointer 124 of the measuring instrument 122 are visible. In contrast to the arrangement disclosed in FIG. 10, the pointer 125 dies not cooperate directly with the instrument pointer 124, but is positioned in the direct-vision part of the path of rays of the viewfinder. However it appears to the observer that the pointer 125 lies directly opposite the pointer 124, the appearance of a mirror image of the pointer 125 being thus avoided. According to FIGS. 10 and 11, the pointer 125 may be adjustable by means of a calculator (see FIGS. 2, 3 and 9), but it may also be designed as pointer of an electric indication instrument energized by means of an adequate circuit by a current representing a function of the quotient $x'/f$.

Figure 12:
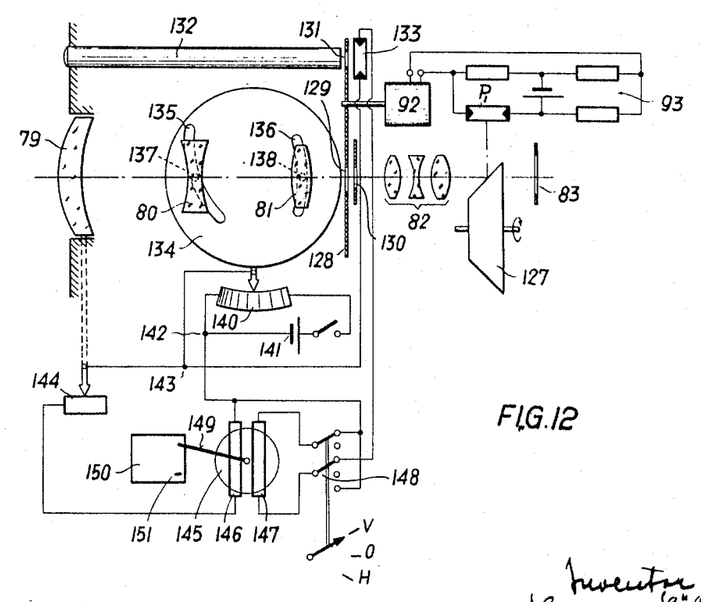
FIG. 12 is a variation of the arrangement shown in FIG. 9.

FIG. 12 discloses a further embodiment of the invention, in particular the optical system of a substandard format film camera. In accordance with FIG. 9 the equipment has a zoom lens, comprising a front-lens attachment 79 to 81 of variable magnification and of a main lens of fixed focal length 82. Between the main lens 82 and the film gate 83 there is provided a mirror shutter 127, which during the transport phase of the film leads the light incident from the lens to a photoelectric resistor 91 arranged in a Wheatstone bridge and which feeds a moving-coil galvanometer without directive force 92. On the shaft of the moving-coil galvanometer there is arranged a diaphragm vane 128 showing a first aperture 129. This aperture determines, together with a stationary mask 130, the opening of the aperture stop of the camera lens. The diaphragm vane 128 further shows a second aperture 131 which is displaceable between a light conductor 132 and a photoelectric resistor 133.

A cam plate 134 is provided for the setting of the focal length, which cam plate shows control curves 135 and 136. The mount of the negative member 80 engages in the curve 135 by means of a pin 137. The mount of the positive member 81 is displaced in the axial direction by means of a pin 138 upon distortion of the cam plate 134. The cam plate is coupled with a sliding contact 139 of a potentiometer 140 situated in the circuit of a battery 141. The variation of resistance along the potentiometer is chosen, such that upon change of the focal length of the lens by distortion of the cam plate 134 there occurs a voltage at the terminals 142 and 143, which is proportional to $1/f$. A rheostat 144 is located at the terminals 142 and 143, which is adjustable by displacement of the front lens 79. The rheostat 144 is arranged in the circuit of an indication instrument 145. This is constructed as a moving-coil differential galvanometer and comprises two parallel windings 146 and 147 on a common frame. A current energizes the first winding, which is determined by the potentiometer 140 and the rheostat 144 and shows an intensity proportional to $x'/f$. The second winding 147 is also fed by the voltage divider potentiometer 140, whereby a photoelectric resistor 133 is disposed in the circuit of this winding. The aperture 131 of the diaphragm vane 128 situated in front of the photoelectric resistor is designed, such that the current flowing through the winding 147 is proportional to $\sigma/f$. Finally a changeover switch 148 is disposed in the circuit of the winding 147, which shows three different settings. The pointer 149 of the differential galvanometer 145 is visible in the gate of a viewfinder system, not shown. A stationary mark 151 confines together with the pointer 149 the respective measuring sections.

The mode of operation of the arrangement described above is the following:

If the changeover switch 148 takes the position indicated by the letter V (see FIG. 12) the currents flowing in the windings 146 and 147 work in the same sense, so that there results a deflection of the pointer, which is proportional $$\left(\frac{x'}{f} + c\frac{\sigma}{f}\right).$$

The deflection of the pointer 149 consequently corresponds to the image size of the reference section on the front depth of field limit. If the changeover switch is deviated to the position H, the current flows in the reverse sense through the winding 147, whereby the current proportional to $\sigma/f$ works against the current proportional to $x'/f$. The deflection of the pointer consequently is proportional $$\left(\frac{x'}{f} - c\frac{\sigma}{f}\right)$$

and corresponds to the image size of the reference section on the rear depth of field limit. If the changeover switch is set to its midposition O, the winding 147 is out of circuit. This situation simulates an infinitely large aperture and therewith an infinitely small $f$-number. In this position the image size of the reference section is indicated by the pointer 149 and lies in the optimum plane of sharpness. The changeover switch 148 may be displaced manually. However arrangements are also possible, where this switch is automatically and periodically reversible between the positions V and H, so that the image sizes of the reference sections are alternately indicated on the front and on the rear depth of field limit.

The present invention is not limited to the shown and described embodiments. It may thus be advantageous to provide means for continuously changing the measuring range instead of changing means corresponding to reference sections of different fixed values. In this case it is advisable to indicate the size of the respective reference sections in the viewfinder. This can immediately be effected by an indication of length for instance in meters. It however may be advisable to introduce symbols at least for the indication of some selected intermediate values, stating the respective measuring size.

In cameras in which distance setting is automatically adjusted upon changing the focal length, thus that the rear depth of field limit lies in infinity, it is of course possible to abandon the indication on the rear depth of field limit, so that only a single measuring section appears in the viewfinder.

We claim:

1. In a camera an objective, focusing means for said objective, a diaphragm situated within said objective and being adjustable with respect to the brightness of the scene to be taken, a viewfinder system, at least first and second indicator means visible in the viewfinder, adjusting means for at least one of said indicator means to vary the distance between said indicator means, said distance defining a section of line visible in said viewfinder, said section of line corresponding to a perspective reproduction of a fictitious section of line of known size, said fictitious section of line being supposed to be situated on one of the limits of the depth of field, calculating means computing said depth of field and the length of said distance from a given set of values and controlling the adjusting means accordingly, said values determining at least one limit of the depth of field and comprising at least the diaphragm aperture and the setting of said focusing means.

2. In a camera according to claim 1, third indicator means defining a second section of line visible in said viewfinder, said second section of line corresponding to a perspective reproduction of said fictitious section of line being supposed to be situated on the other limit of the depth of field, adjusting means for said third indicator means, said calculating means being adapted to compute the length of both distances and to control said adjusting means.

3. In a camera according to claim 1, wherein the length of said fictitious section of line is chosen from the sizes of human body.

4. In a camera according to claim 1, wherein said calculating means is a mechanical calculator.

5. In a camera an objective, focusing means for said objective, a diaphragm situated within said objective and being adjustable with respect to the brightness of the scene to be taken, a view finder system, at least two indicator means visible in said viewfinder, adjusting means for at least one of said indicator means to vary the distance between two at a time of said indicator means, said distance defining a section of line visible in said viewfinder, said section of line corresponding to a perspective reproduction of a fictitious section of line of known size, said fictitious section of line being supposed to be situated on one of the limits of the depth of field, changing means to adapt said section visible in the viewfinder to fictitious sections of different sizes, calculating means computing said depth of field and the length of said distance between said indicator means from a given set of values and controlling the adjusting means accordingly, said values determining at least one limit of the depth of field and comprising at least the diaphragm aperture and the setting of said focusing means.

6. In a camera an objective, focusing means for said objective, a diaphragm situated within said objective and being adjustable with respect to the brightness of the scene to be taken, a viewfinder system, at least first and second indicator means visible in the viewfinder, said first indicator means comprising a pointer and a screen, a diagram borne by said screen and being adapted to be intersected by said pointer, adjusting means for at least one of said indicator means to vary the distance between said indicator means, said adjusting means comprising a first adjustment device for said pointer and s second adjustment device for said screen, said distance between said indicator means defining a section of line visible in the viewfinder, said section of line corresponding to a perspective reproduction of a fictitious section of line of known size, said fictitious section of line being supposed to be situated on one of the limits of the depth of field, calculating means computing said depth of field and the length of said distance from a given set of values and controlling the adjusting means accordingly, said values determining at least one limit of the depth of field and comprising at least the diaphragm aperture and the setting of said focusing means, said first adjustment device displacing said pointer in dependence on at least one of said values, whereas said second adjustment device displaces said screen in dependence on another of said values.

7. In a camera according to claim 6, wherein said objective is a zoom objective, said pointer is displaced in dependence on the focal length of said objective, whereas the screen is displaced in dependence on the diaphragm aperture.

8. In a camera according to claim 7, wherein said screen is transparent and displaceable in an image plane of said viewfinder, said diagram showing a hyperbolic curve, the point of intersection of said pointer and that curve confining said section of line visible in said viewfinder at one end, a second pointer adapted to intersect the pointer of said first indicator means, second adjusting means controlled by said calculating means and displacing said second pointer in dependence on the setting of said focusing means and the focal length of said objective, the point of intersection of said first and said second pointer confining said section of line at the other end.

9. In a camera a zoom objective, focusing means for said objective, setting means for the focal length of said objective, a diaphragm situated within said objective and being adjustable with respect to the brightness of the scene to be taken, a viewfinder system, at least first and second indicator means visible in the viewfinder, adjusting means for at least one of said indicator means to vary the distance between said indicator means, said distance defining a section of line visible in the viewfinder, said section of line corresponding to a perspective reproduction of a fictitious section of line of known size, said fictitious section of line being supposed to be situated on one of the limits of the depth of field, calculating means computing said depth of field and the length of said distance from a given set of values and controlling the adjusting means accordingly, said values determining at least one limit of the depth of field and comprising at least the diaphragm aperture and the setting of said focusing means, said calculating means comprising at least first, second and third control levers, each of which having at least one slot means, a guide pin penetrating said slot means of said control levers, said first control lever being displaceable in dependence on the focal length setting of said objective, said second control lever being displaceable in dependence on the setting of said focusing means, whereas said third control lever controls one of said adjusting means.

10. In a camera according to claim 9, differential control means displacing said first control lever, changing means to adapt said sections visible in said viewfinder to fictitious sections of different sizes, said setting means and said changing means being drivingly connected to said differential control means.

11. In a camera a zoom objective, focusing means for said objective, setting means for the focal length of said objective, a diaphragm situated within said objective and being adjustable with respect to the brightness of the scene to be taken, a viewfinder system, at least first and second indicator means visible in the viewfinder, said first indicator means comprising a pointer and a screen, a diagram borne by said screen and being adapted to be intersected by said pointer, adjusting means for at least one of said indicator means to vary the distance between said indicator means, said adjusting means comprising a first adjustment device for said pointer and a second adjustment device for said screen, said distance between said indicator means defining a section of line visible in said viewfinder, said section of line corresponding to a perspective reproduction of a fictitious section of line of known size, said fictitious section of line being supposed to be situated on one of the limits of the depth of field, calculating means computing said depth of field and the length of said distance from a given set of values and controlling said adjusting means accordingly, said values determining at least one limit of the depth of field and comprising at least the diaphragm aperture and the setting of said focusing means, said first adjustment device including differential control means displacing said pointer, changing means to adapt said sections visible in said viewfinder to fictitious sections of different sizes, said setting means and said changing means being drivingly connected to said differential control means, said second adjustment device displacing said screen in dependence on the diaphragm aperture.

12. In a camera an objective, focusing means for said objective, a diaphragm situated within said objective and being adjustable with respect to the brightness of the scene to be taken; a viewfinder system, at least first and second indicator means visible in the viewfinder; said first indicator means comprising pointer means and a screen, a diagram borne by said screen and being adapted to be intersected by said pointer means; adjusting means for at least one of said indicator means to vary the distance between said indicator means, said distance defining a section of line visible in the viewfinder and corresponding to a perspective reproduction of a fictitious section of line of known size, said fictitious section of line being supposed to be situated on one of the limits of the depth of field; said adjusting means comprising a first adjustment device for said pointer means and a second adjustment device for said screen; said first adjustment device displacing the pointer means in dependence on at least one of the values of the focal length and the setting of the focusing means; said second adjustment device including a photoelectric cell, motor means electrically connected to and controlled by said cell and regulating automatically the value of the diaphragm aperture, said motor means being drivingly connected with said screen to rotate the same about an axis of rotation; said diagram having polar ordinates comprising a center situated on said axis of rotation; calculating means computing said depth of field and the length of said distance from a given set of said values and controlling the adjusting means accordingly.

13. In a camera according to claim 12, wherein said objective is a zoom objective, a Dove inverting prism having an axis of symmetry standing vertically to the prism edge, drive means for said prism being controlled by said first adjustment device and rotating said prism about a swivel axis with half of the angular speed with respect to the speed of said screen, thereby distorting said ordinates parallelly to said section of line visible in said viewfinder.

14. In a camera according to claim 13, wherein said diagram shows a pair of curves spaced apart and being arranged symmetrically with respect to a circular line having its center on said axis of rotation; said swivel axis being arranged on said circular line; said drive means comprising support lever means being pivotally arranged about said swivel axis and rigidly connected to said prism, drive lever means rotatable about said axis of rotation and being connected with said prism, whereby the angles of rotation of said screen and said axis of symmetry form angles at the center and at the periphery of said circular line.

15. In a camera an objective, focusing means for said objective, a diaphragm situated within said objective and being adjustable with respect to the brightness of the scene to be taken, a viewfinder system, at least first and second indicator means visible in the viewfinder, adjusting means including electric drive means for at least one of said indicator means to vary the distance between said indicator means, said distance defining a section of line visible in said viewfinder, said section of line corresponding to a perspective reproduction of a fictitious section of line of known size, said fictitious section of line being supposed to be situated on one of the limits of the depth of field, calculating circuit means computing said depth of field and the length of said distance from a given set of values and delivering a current in accordance with the results obtained to said electric drive means, said values determining at least one limit of the depth of field and comprising at least the diaphragm aperture and the setting of said focusing means.

16. In a camera according to claim 15, wherein said focusing means are shiftable and said current results from a first and a second component generated by said calculating circuit means within a first and a second circuit branch, the first component being proportional to a quotient $x'/f$, the second one to a quotient $\sigma/f$, wherein $x'$ is the shifting of said focusing means required to focus said objective, $f$ is the focal length of the objective and $\sigma$ is the diaphragm stop.

17. In a camera according to claim 16, interrupter means being arranged within said second circuit branch and having an operative and an inoperative position; in operative position interrupting said second current component, whereby said electric drive means are controlled only by said first circuit component and said section of line visible in said viewfinder corresponds to the fictitious section of line supposed to be situated within the focus plane.

18. In a camera according to claim 16, polarity reversal means being arranged within said second circuit branch and adapted to reverse the direction of the second current component with respect to the direction of the first one, whereby with unidirectional current components said section of line visible in said viewfinder corresponds to the fictitious section of line supposed to be situated on the front limit of the depth of field, with opposite current components said section of line visible in the viewfinder corresponds to the fictitious section supposed to be situated on the rear limit of the depth of field.

19. In a camera according to claim 18, manually operable means for said polarity reversal means.

20. In a camera an objective, shiftable focusing means for said objective, a diaphragm situated within said objective and being adjustable with respect to the brightness of the scene to be taken, a viewfinder system, at least first and second indicator means visible in the viewfinder and having a variable distance from one another, said distance defining a section of line visible in said viewfinder, said section of line corresponding to a perspective reproduction of a fictitious section of line of known size, said fictitious section of line being supposed to be situated on one of the limits of the depth of field; an electric measuring instrument; the first indicator means comprising a pointer connected with said measuring instrument, said second indicator means including a stationary zero mark; calculating circuit means computing said depth of field and the length of said distance from a given set of values and delivering to said electric measuring instrument a first and a second current component within a first and a second circuit branch, the first component being proportional to a quotient $x'/f$, the second one to a quotient $\sigma/f$, wherein $x'$ is the shifting of said focusing means required to focus said objective, $f$ is the focal length of the objective and $\sigma$ is the diaphragm stop; said second circuit branch comprising AC generating means for current of low frequency, said pointer oscillating with the frequency of the alternating current and with an amplitude proportional to 2 $\sigma/f$, in one of the extreme positions of said pointer with respect to said stationary zero mark said section of line visible in the viewfinder corresponds to the fictitious section of line supposed to be situated on the front limit of the depth of field, in the other extreme position of said pointer said section of line visible in the viewfinder corresponds to the fictitious section of line supposed to be situated on the rear limit of the depth of field.

21. In a camera an objective, shiftable focusing means for said objective, a diaphragm situated within said objective and being adjustable with respect to the brightness of the scene to be taken; a viewfinder system; first and second electric measuring means having pointers, the first one being fed with a current proportional to $$\left(\frac{x'}{f} + c \cdot \frac{\sigma}{f}\right),$$

the second one being fed with a current proportional to $$\left(\frac{x'}{f} - c \cdot \frac{\sigma}{f}\right),$$

wherein $x'$ is the shifting of the focusing means required to focus said objective, $f$ is the focal length of the objective, $\sigma$ is the diaphragm stop and $c$ is a constant of proportionality; indicator means visible in the viewfinder and having a distance each, on the one hand, from the pointer of the first measuring means, on the other hand, from the pointer of said second measuring means, said distances defining sections of lines visible in said viewfinder, said sections of lines corresponding to perspective reproductions of a fictitious section of line of known size, said fictitious section of line being supposed to be situated on each of both limits of the depth of field; current generating means; electric calculating means connected with said current generating means computing said depth of field and the length of said distances from the values of $x'$, $f$, $\sigma$ and $c$.

22. In a camera an objective, focusing means for said objective, a diaphragm situated within said objective and being adjustable with respect to the brightness of the scene to be taken, a viewfinder system, at least first and second indicator means visible in the viewfinder, adjusting means for said indicator means to vary the distance between said indicator means, said distance defining a section of line visible in said viewfinder, said section of line corresponding to a perspective reproduction of a fictitious section of line of known size, said fictitious section of line being supposed to be situated on at least one of the limits of the depth of field, said adjusting means comprising electric drive means energized by a current; said first indicator means including a pointer connected with said electric drive means and having a zero position, said pointer having an axis of rotation, mirror means being aligned with said pointer in zero position and with its axis of rotation, calculating means comprising calculating circuit means controlling the adjusting means by delivering a current to said electric drive means, said current being proportional to a quotient $\sigma/f$, wherein $\sigma$ is a diaphragm stop and $f$ is the focal length of said objective; said pointer being visible in said viewfinder directly and as a mirror image by means of said mirror means, the distance between said pointer directly seen and said zero position being proportional to $(+\sigma/f)$, the distance between said mirror image and said zero position being proportional to $(-\sigma/f)$.

23. In a camera according to claim 22, said mirror means being colored, said pointer and said mirror image appearing in different colors.

24. In a camera according to claim 22, said pointer and said mirror means being placed outside the light path of said viewfinder, beam-splitting means reflecting said pointer and said mirror image into the light path of said viewfinder.

25. In a camera according to claim 22, said focusing means being shiftable, said second indicator means being displaceable in accordance with the variations of a quotient $x'/f$, wherein $x'$ is the shifting of said focusing means and $f$ is the focal length of said objective.

26. In a camera according to claim 25, said calculating means further comprising a mechanical calculator controlling said second indicator means.

27. In a camera a zoom objective, setting means for the focal length of said objective, focusing means for said objective, an aperture diaphragm situated within said objective and being adjustable with respect to the brightness of the scene to be taken, a viewfinder system, at least first and second indicator means visible in the viewfinder, adjusting means including electric drive means for at least one of said indicator means to vary the distance between said indicator means, said distance defining a section of line visible in the viewfinder, said section of line corresponding to a perspective reproduction of a fictitious section of line of known size, said fictitious section of line being supposed to be situated on one of the limits of the depth of field, calculating circuit means comprising current generating means delivering a current, potentiometer means drivingly connected with said setting means for the focal length and dividing the voltage of said current in a ratio $1:f$, wherein $f$ is the focal length, first variable resistor means controlled by said focusing means, second variable resistor means controlled by the diaphragm aperture, said potentiometer means together with said first variable resistor means delivering a first current component, said potentiometer means together with said second variable resistor means delivering a second component, said electric drive means being energized by said current component.

28. In a camera according to claim 27, said second variable resistor means comprising photoelectric detector means, an auxiliary diaphragm in front of said detector means being connected with said aperture diaphragm and controlling said detector means, the current variations rendered only by said detector means being proportional to the aperture diaphragm stop.

29. In a camera according to claim 28, wherein said photoelectric detector means is a photoelectric resistor.

30. In a camera a zoom objective, setting means for the focal length of said objective, focusing means for said objective, an aperture diaphragm situated within said objective and being adjustable with respect to the brightness of the scene to be taken, a viewfinder system, at least first and second indicator means visible in the viewfinder, adjusting means including electric drive means for at least one of said indicator means to vary the distance between said indicator means, said distance defining a section of line visible in said viewfinder, said section of line corresponding to a perspective reproduction of a fictitious section of line of known size, said fictitious section of line being supposed to be situated on one of the limits of the depth of field, calculating circuit means computing said depth of field and the length of said distance from a given set of values and delivering a current in accordance with the results obtained to said electric drive means, said values determining at least one limit of the depth of field; said calculating circuit means comprising a measuring chamber, photoelectric detector means being shiftable within said measuring chamber and connected with said setting means for the focal length, an auxiliary diaphragm positioned in front of said detector means and having a variable distance $e$ therefrom, said distance $e$ being equal to $\sqrt{f}$, wherein $f$ is the focal length of said objective, said auxiliary diaphragm being connected with said aperture diaphragm, the square root of the $f$-numbers of said aperture diaphragm corresponding to the $f$-number of said auxiliary diaphragm, the output voltage of said detector means varying in correspondence with the variations of the quotient $\sigma/f$, wherein $\sigma$ is the $f$-number of said aperture diaphragm and $f$ is the focal length of said objective.

31. In a camera according to claim 30, wherein said photoelectric detector means is a photoelectric resistor.